US009155243B2

(12) United States Patent
Heintzman

(10) Patent No.: US 9,155,243 B2
(45) Date of Patent: Oct. 13, 2015

(54) AIR DRILL DIFFUSER

(76) Inventor: Rick Heintzman, Fargo, ND (US)

( * ) Notice: Subject to any disclaimer, the term of this patent is extended or adjusted under 35 U.S.C. 154(b) by 659 days.

(21) Appl. No.: 13/506,089

(22) Filed: Mar. 26, 2012

(65) Prior Publication Data

US 2013/0247803 A1    Sep. 26, 2013

(51) Int. Cl.
*A01C 7/00* (2006.01)
*A01C 7/08* (2006.01)
*A01C 7/20* (2006.01)

(52) U.S. Cl.
CPC ............... *A01C 7/082* (2013.01); *A01C 7/206* (2013.01)

(58) Field of Classification Search
USPC .............. 111/174–176, 170, 200; 221/13, 14, 221/289, 290; 138/37, 42
See application file for complete search history.

(56) References Cited

U.S. PATENT DOCUMENTS

| | | | | |
|---|---|---|---|---|
| 1,382,771 | A | * | 6/1921 | Ford ................................ 111/51 |
| 2,885,978 | A | * | 5/1959 | Miller ............................ 111/149 |
| 3,195,485 | A | * | 7/1965 | Reynolds ....................... 111/150 |
| 4,155,376 | A | * | 5/1979 | Stahli .............................. 138/42 |
| 4,669,922 | A | * | 6/1987 | Hooper et al. ................. 406/157 |
| 4,911,090 | A | * | 3/1990 | Schimke ........................ 111/150 |
| 5,351,635 | A | * | 10/1994 | Hulicsko ........................ 111/135 |
| 5,522,328 | A | * | 6/1996 | Long .............................. 111/176 |
| 7,490,565 | B2 | * | 2/2009 | Holly ............................ 111/174 |
| 7,854,205 | B2 | * | 12/2010 | Beaujot ......................... 111/176 |

* cited by examiner

*Primary Examiner* — Alicia Torres
(74) *Attorney, Agent, or Firm* — D L Tschida

(57) ABSTRACT

A diffuser adapted to dissipate air from seed conveyed in a stream of air at a planter to an opener arm and seed boot. The diffuser provides a housing that pivotally supports a counter-weighted valve piece and a resilient valve piece. Admitted seeds are resiliently deflected between the valve pieces. Repeated deflections between the dual valve pieces and simultaneous venting of the conveying air through an associated fulcrum screen and relief ports at the housing dissipate the conveying air. Spent seed momentarily collects on a surface inside the housing and gravitationally falls from the housing and through a lower lying seed boot at a relatively uniform, singulated rate without scatter and damage to the seed.

20 Claims, 5 Drawing Sheets

AIR DRILL DIFFUSER

BACKGROUND OF THE INVENTION

The present invention relates to air seeders and, in particular, to a diffuser for reducing air pressure at the distribution point of an air seeder to substantially zero to gravitationally deposit seed at a uniform preset soil depth and seed spacing.

A wide variety of agricultural seeders have been developed for planting seeds in prepared soil. A common seeder type found at relatively large farm operations is known as an "air drill" or "air seeder". Multiple openers (i.e. planting/fertilizing arms) are typically mounted to a tractor-towed framework. The openers are commonly supported at preferred row spacings to wings or arms that span multiple rows. The wings collapse (e.g. fold upward) to permit travel over roads and deploy from a collapsed travel condition to span the intended row spacing.

Each seeder typically provides an opener head or "seed boot arm" assembly to open and control the depth of each opened furrow. Associated controls and assemblies are included to clean each furrow (e.g. scraper member), tamp the planted seed (e.g. seed firming wheel), and close the furrow (e.g. packer wheel). The seed is dispensed from a covered hopper and an associated fan powered air distribution assembly. The seed is directed from the hopper, sorted and directed via appropriate conduits and tubing to individual distribution ports at relatively high pressures to dispense individual seeds in the prepared furrows.

A problem common to air seeders is that of delivering the seeds at relatively high air pressures and high velocities that cause the seeds to bounce in or around the furrows and/or out of the furrows and consequently produce inconsistent seed placement and germination. The seeds during delivery to the seed boot may also be damaged such that cracked or split seed may not successfully germinate.

One solution to the problem of which applicant is aware is promoted under the name "D-Cup Diffuser". The diffuser provides a conical housing having an internal spiral passageway that tapers from a large diameter input port to a narrowed diameter outlet port. Air borne seed is tangentially directed into the passageway at the input port. The conveying air is dissipated to the atmosphere at the input end of the diffuser. The seed is directed down through the spiral passageway and falls from the outlet port. The air pressure is dissipated until the seed falls only under the force of gravity.

A problem persists if the seed boot plugs with mud, debris or other matter during difficult planting times as the seeds then tend to follow the air stream and blow out the top of the device and producing skips in the planted field. Even though seed hose monitoring devices exist that alert an operator to a plugged delivery line, the operator typically is not alerted with sufficient lead time to correct the plugged condition since seeds are still flowing through the air/seed hose. Instead of being deposited into the furrow, the seeds are broadcast onto the top of the soil.

The present invention was developed to provide an alternative air diffusion assembly to gravity dispense seed from an air seeder. The diffuser includes a formed, resiliently mounted first valve piece in a tubular housing to reduce initial seed velocity. The seed deflects from the first valve piece to strike an associated second resiliently mounted valve piece. A screen fitted into a bore of the housing supports and cooperates with the first valve piece to produce multiple deflections of the seed between the valve pieces as air pressure is bled off. The first valve piece is mounted to pivot from the screen member and includes counter weight and deflection arm portions. Ultimately, the seed falls under the influence of gravity through a dispensing port.

A projecting flange or ledge piece exhibiting a half-moon shape adjacent the dispensing port momentarily collects the spent seed. The spent seed tends to fall from the flange at a relatively uniform, generally singulated rate into a prepared furrow with a spacing determined by the operating ground speed of the dispensing port. The seed particularly falls into a prepared furrow at a predetermined depth optimal to the growth of the particular seed.

The relative displacement between seeds of the gravity placed seed assures a relatively uniform germination with less loss and damage to the seed. If wet and/or muddy conditions exist at the time of planting and a seed boot plugs with mud, grass, crop or surface debris or the like, the diffuser of the invention simply keeps seed from blowing from the included vents. A warning device alerts the operator to a plugged run earlier than with other devices which permits the operator to stop and clean the plugged condition to avoid further crop spacing skips in the field being planted.

SUMMARY OF THE INVENTION

It is a primary object of the invention to provide a device for diffusing or dissipating an air stream conveying seed to a seed planting boot to obtain uniform seed placement (i.e. spacing and depth).

It is a further object of the invention to provide a device for deflecting seed between multiple valve pieces and simultaneously diffusing or dissipating air conveying the seed as the seed is directed to a planting boot to obtain seed singulation (e.g. avoid double and triple seed placement especially for large seeds like sunflower and soybean seed).

It is further object of the invention to provide a housing that mounts to a seed conveying conduit containing valve members positioned to resiliently ricochet or deflect seed back and forth between the valve members as the seed is conveyed to an outlet port.

It is a further object of the invention to provide a housing containing at least one resiliently mounted valve member.

It is further object of the invention to provide a housing containing a counter weighted, pivotally mounted valve member.

It is a further object of the invention to provide a housing containing a counter weighted valve member mounted to pivot relative to a screen member.

It is a further object of the invention to provide a resiliently mounted or counter weighted valve member mounted to pivot relative to a screen member and deflect seed back and forth between the valve member and screen as air is dissipated from the housing.

The foregoing objects, advantages and distinctions of the invention are obtained in a diffuser assembly adapted for use with a variety of air seeders. In one construction, the assembly comprises a diffuser that includes one or more valve pieces resiliently mounted in the bore of a tubular housing to deflect seed in a fashion to dissipate the conveying air and gravitationally dispense spent seed.

In a presently preferred construction, the seed deflects from a first resiliently mounted valve piece to strike an associated second resiliently mounted valve piece. A screen fitted into a bore of the housing supports and cooperates with the first valve piece to produce multiple deflections of the seed between the valve pieces as air pressure is bled off. The first valve piece is mounted to pivot from the screen member and includes a counter weight arm and deflection arm. The second valve piece is mounted in the housing to resiliently flex upon seed impact. Ultimately, generally singulated seeds fall under the influence of gravity through a dispensing port into a prepared furrow at a relatively uniform spacing.

A variety of alternative configurations and combinations of features of the inventive diffuser can be developed. For example, a diffuser can includes one or more of the individual valve pieces or combinations thereof. Alternatively, multiple counter weighted valve pieces might be supported in the housing to deflect seed back and forth between the valve members. Alternatively, multiple resiliently mounted valve pieces might be supported in the housing to deflect seed back and forth between the valve members. Pivoting valve pieces might also be supported to pivot on structures other than a screen.

Still other objects, advantages, distinctions, constructions and combinations of individual features of the invention will become more apparent from the following description with respect to the appended drawings. Similar components and assemblies are referred to in the various drawings with similar alphanumeric reference characters. The description to each combination should therefore not be literally construed in limitation of the invention. It is also to be appreciated the singular improvements can be combined in any variety of track assemblies. The invention should therefore be interpreted within the broad scope of the further appended claims.

DESCRIPTION OF THE PREFERRED EMBODIMENTS

Figure 1:
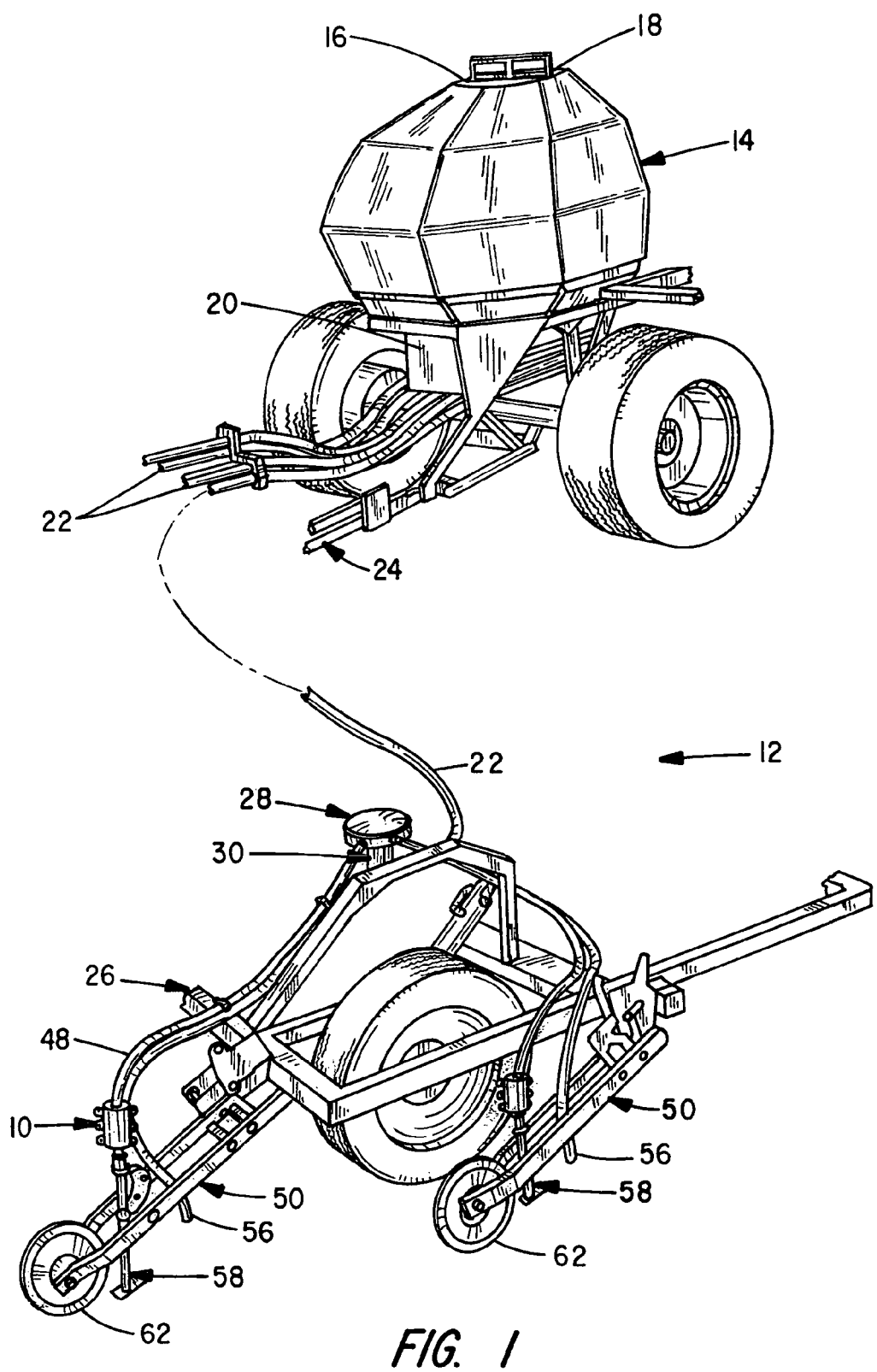
FIG. 1 shows a perspective view of the diffuser of the invention mounted to a planting head or seed boot assembly that is secured to a tractor drawn framework and fed with seed delivered from a hopper and one of several air/seed distribution manifolds and conduits that extend between the hopper, manifold, and a planting wing or arm to one of several seed boot delivery heads fitted to the wing assembly.

With attention to the perspective view of FIG. 1, an air drill diffuser 10 of the invention is shown as it appears when mounted to a typical tractor drawn air drill assembly 12. The air drill assembly 12 typically includes a trailer storage bin 14 having fertilizer and seed compartments or hoppers 16 and 18. The seed is delivered from the seed compartment 18 to a primary air and seed distribution manifold 20 and conveyed as an airborne particulate through several feeder conduits 22 to a trailer drawn planter framework 24. The framework 24 is typically mounted to follow the bin 14 and one or more arms or wing frames 26 are hinged to pivot about the framework 24. Multiple planter opener arm assemblies 50 having fertilizer and seed distribution ports in turn are supported to the wings 26. The fertilizer is independently distributed from the fertilizer compartment or hopper 16 to a separate primary fertilizer distribution manifold 20 and separate feeder conduits 22 to the planter framework 24.

The seed and fertilizer feeder conduits 22 extend along the planter framework 24 and the hinged wing frames 26 where the conduits 22 couple to lower ends of several secondary seed and fertilizer distribution manifolds 28. The fertilizer and seeds are injected into the bores of "J-shaped", tubular columns 30 at the manifolds 28 and subjected to contact with several dimpled protrusions 32 that project into the bore 34 of each column 30 to reduce the velocity and separate and agitate the fertilizer and seeds as the fertilizer and seeds rise in the columns 30.

In particular regard to the seeds and after being agitated by the protrusions 32, the seeds rise to a distribution head piece 36. The head piece 36 contains a ring shaped separator having several vertical vanes. As the seeds rise in the bore 34 they are randomly distributed between the internal vanes. The vanes are aligned to associated outlet ports 42 formed at a rubber ring or seal piece 44 mounted in concentric relation to the internal vaned separator.

The primary flow of air and suspended seed is thus diverted into the ports 42 and associated seed delivery conduits 48 that extend to individual opener arm assemblies 50 that each support an individual planter head or seed boot. The opener arm assemblies 50 are supported to the wing frames 26 at an appropriate spacing set for the type of seed being planted.

Figure 2:
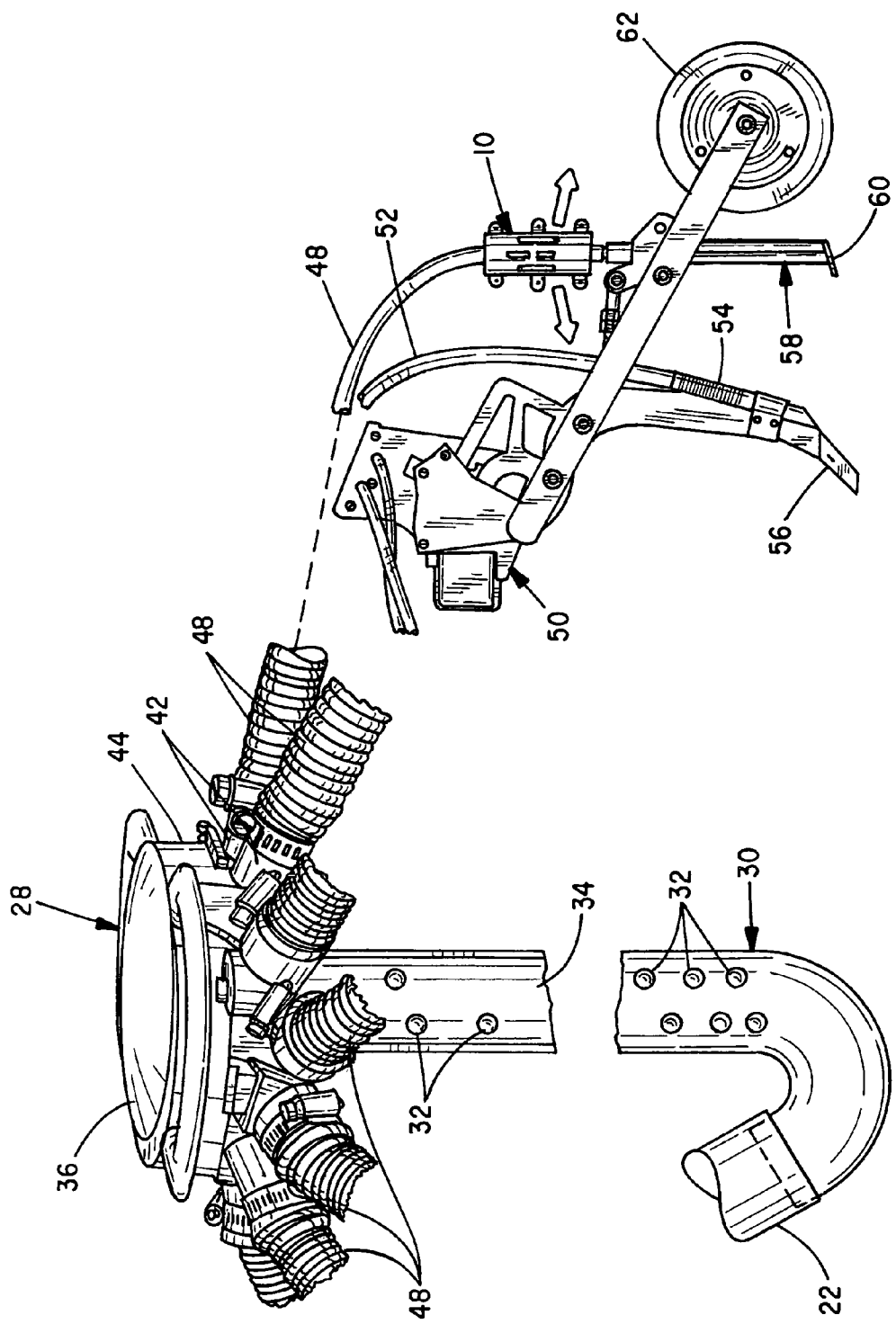
FIG. 2 shows an air/seed distribution manifold (shown foreshortened and in enlarged scale) that directs air borne seed via several supply conduits to each of several air diffusers of the invention only one of which is shown and which is mounted to the seed distribution conduit at a seed boot assembly.

Fertilizer is separately conveyed from other secondary distribution manifolds 28 to the seed boot of each opener arm assembly 50 and a prepared furrow. Each opener arm assembly 50 independently receives and dispenses an appropriate amount and type of fertilizer for the seed being planted. The air directed fertilizer is conveyed through a fertilizer conduit 52 to a distribution tube 54, see FIG. 2. The fertilizer tube 54 is placed behind an opener head 56 which forms a planting furrow and into which the fertilizer is deposited to an appropriate depth.

A seed placement or planting head 58 is independently supported to each opener arm assembly 50 behind each opener head 56 and fertilizer distribution tube 54. The depth of the head 58 is set to assure proper placement of gravitationally fed seed. Seed distributed by each secondary manifold 28 is conducted into and through the seed conduits 48 to the seed diffusers 10 of the invention and deposited from a seed placement boot 60.

As the air and seed enter each diffuser 10, the seed is caused to contact and ricochet or deflect back and forth between included valve pieces and the conveying air is simultaneously bled off. Ultimately the air is completely bled off and the seed collects and is momentarily supported on a seed support ledge 112 (e.g. half-moon shaped) inside the diffuser 10 before falling at a generally singular rate through the seed placement boot 60 under the force of gravity into a prepared furrow. At least one presser wheel 62 typically follows each planting head 58 to close each furrow over the deposited fertilizer and seed. The spacing between seeds is thereby primarily determined by the towed velocity over ground of each opener arm assembly 50.

With the aid of the diffuser 10, the air drill planting assembly 12 provides a relatively controlled, gravity placement of the seed without problems of seed fracture (e.g. cracking or splitting) and/or seed scatter. That is by dissipating the distribution air in the diffuser 10, the seeds fall at a generally uniform rate and equal spacing to a pre-established depth for optimal soil/seed contact. Seed spacing is also dependent upon the towing speed of the opener arms 50, while proper placement depth is established at the furrow opener 56 and mounting height of the seeder head 60 relative to opened furrows. The seed falls from the seeder head 60 and provides for a gravity distribution of the seed without bounce or scatter and unaffected by the distribution air.

Figure 3:
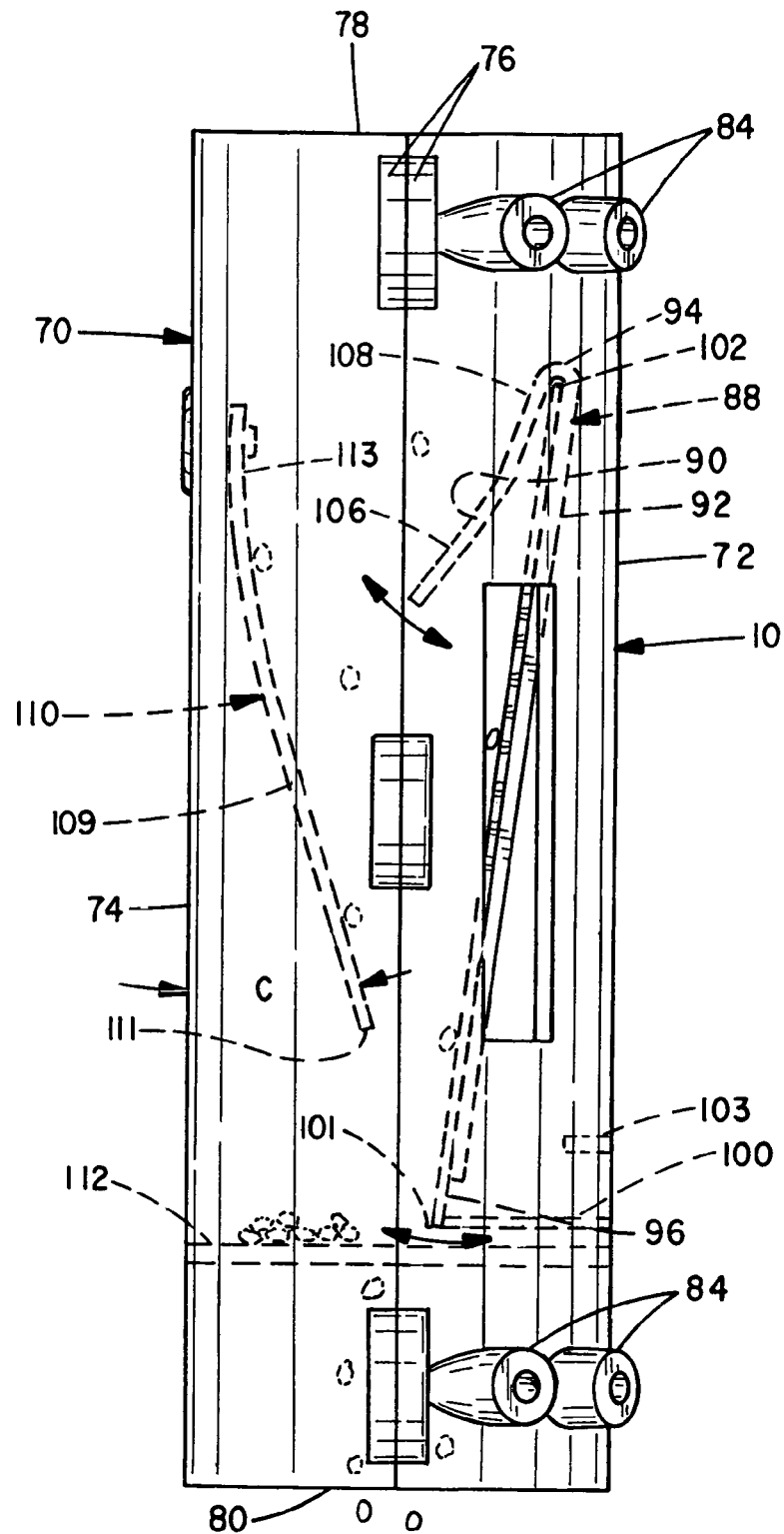
FIG. 3 shows a side view to the diffuser oriented to depict the internal valve pieces and a support screen fitted within the housing and shown in dashed line relative to seeds being deflected back and forth between the valve pieces within the housing bore as air is dissipated through side wall air exhaust ports and spent seed is dispensed from a distribution port adjacent a projecting collection flange exhibiting a half-moon shaped shelf.
Figure 4:
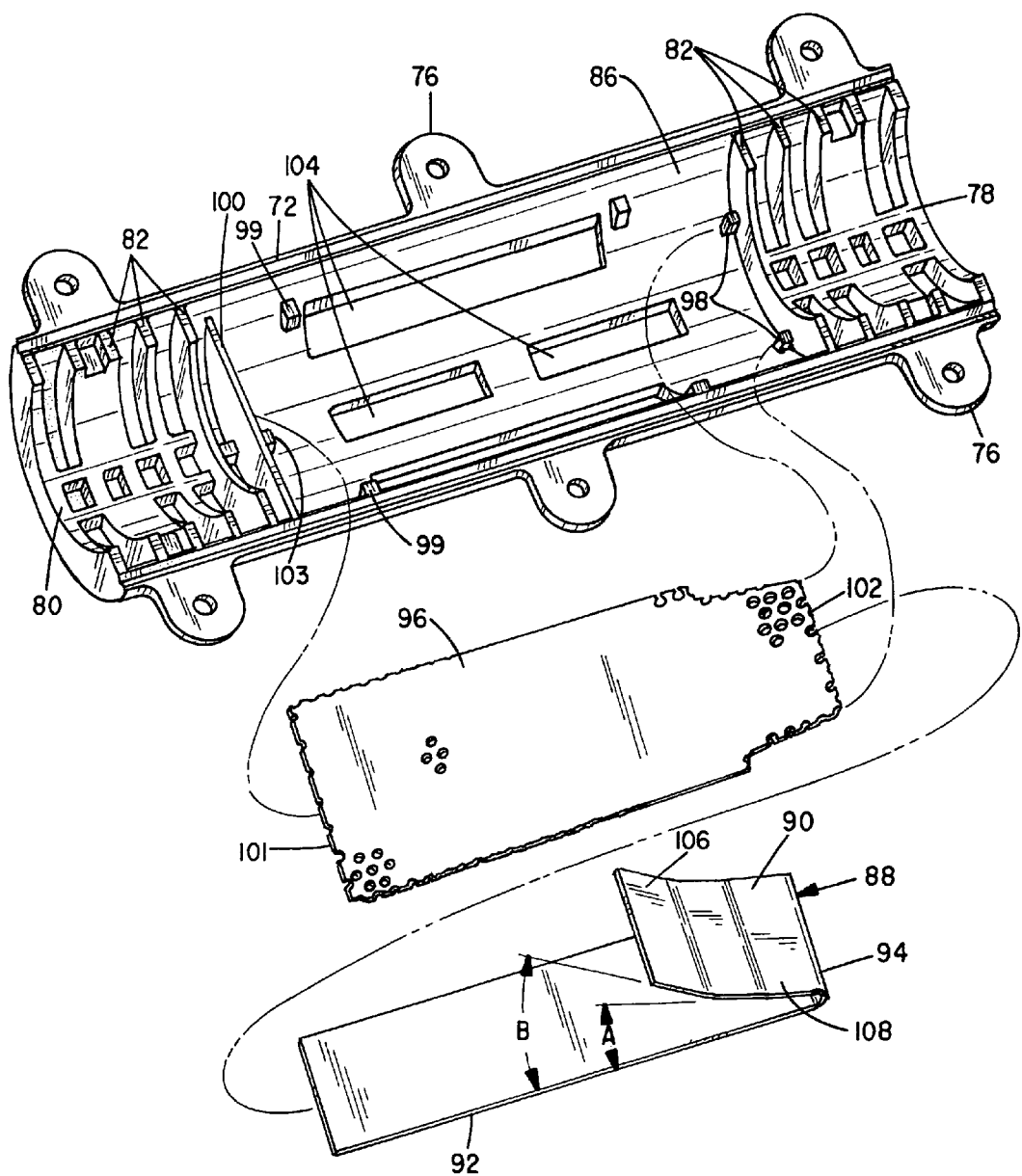
FIG. 4 shows a perspective view in exploded assembly to one of two housing pieces which supports a forward mounted, pivoting, counter weighted valve piece that is mounted to pivot from a support screen of the diffuser.
Figure 5:
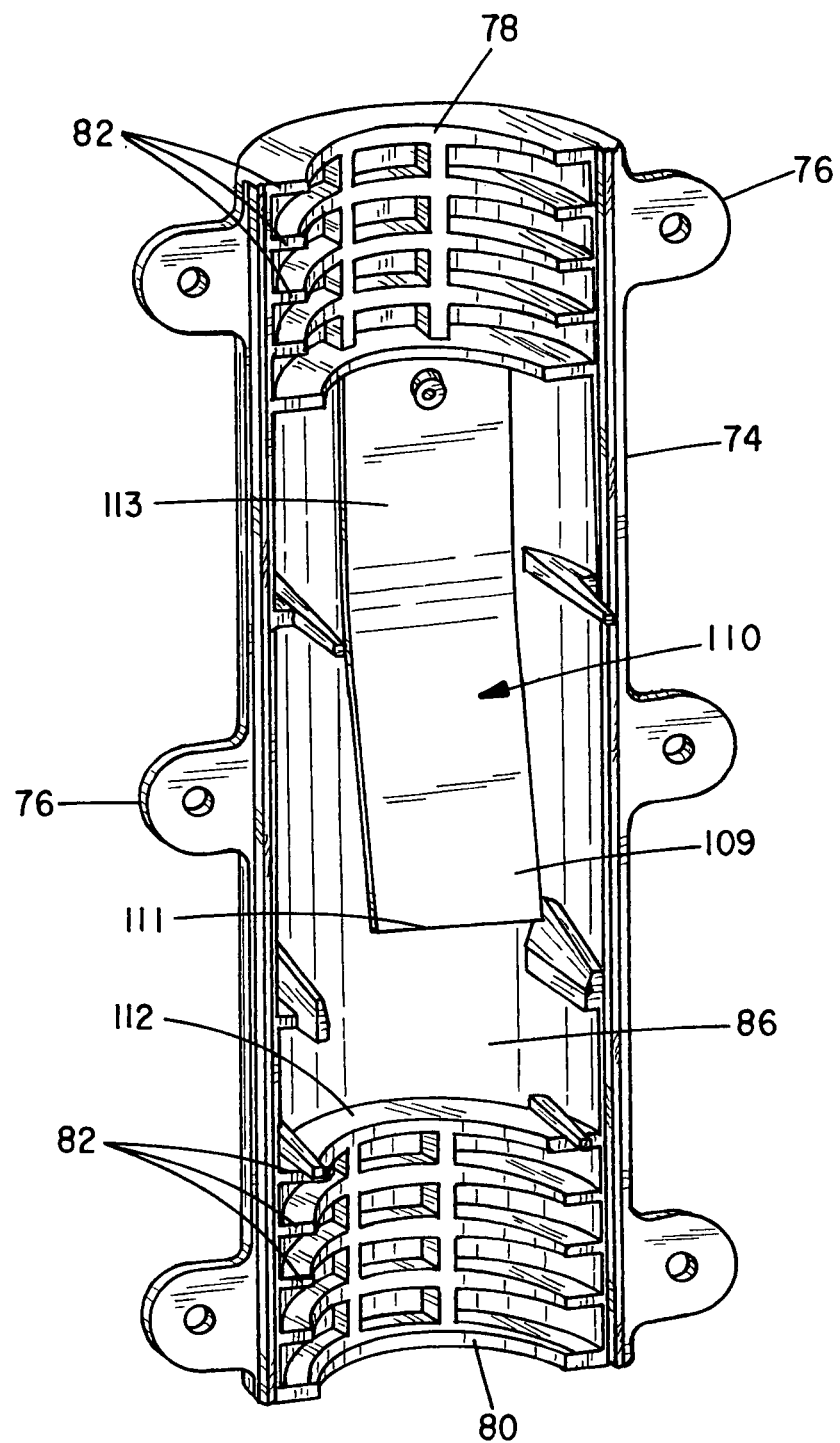
FIG. 5 shows a perspective view to the second of the two housing pieces and a resiliently supported, deflection valve piece that is mounted to flex and deflect seed back and forth to the pivoting first valve piece.

With attention to FIGS. 3 through 5 details to the construction applicant's diffuser 10 are depicted. The diffuser 10 is particularly shown in assembled and exploded assembly. Each diffuser 10 generally provides a tubular housing 70 constructed from two mating or overlapping side wall or shell pieces 72 and 74. Rivets or other fasteners (not shown) secure the side wall pieces 72 and 74 together at tangs 76 that project from the shell pieces 72 and 74.

Upstream/inlet and downstream/outlet ports 78 and 80 are configured and sized in the internal ends of the mated shell pieces 72 and 74. The ports 78 and 80 interconnect and mate with specific seed conduits 48 (e.g. 1¼ or 1½ inch) provided at commercial planters 12. The diffusers 10 are designed to mount as either before or after market accessories to each opener arm assembly 50. Upon inserting the upstream and downstream cut ends of each conduit 48 into the ports 78 and 80, the conduit 48 is gripped by several ringed ridges 82 or other devices to capture the diffuser 10 to the conduit 48. The ports 78 and 80 and ridges 82 are sized and shaped to facilitate a secure fastening of the diffuser 10 relative to the operating environment and conditions.

Appropriate fasteners (e.g. screws) are also inserted through raised hubs 84 at the housing side wall 72 to secure the inlet and outlet ends of the diffuser housing 70 to the conduits 48. Although one form of attachment and fastening of the housing 70 to the conduits 48 is shown, a variety of other couplings and fastenings can be used to physically secure each housing 70 to appropriate air and seed delivery conduits.

Mounted at the upstream or forward end of a cylindrical cavity, bore or channel space 86 within the housing 70 is a resiliently mounted valve piece 88. The valve piece 88 is particularly hinge mounted. The valve piece 88 provides a leading seed deflecting arm portion 90 and a counter weight lagging arm portion 92. The arm portions 90 and 92 extend at an angular orientation "A-A" in the range of 10 to 25 degrees relative to each other. An intermediate fold or bend 94 separates the leading and lagging arm portions 90 and 92 and permits the valve piece 88 to pivot at the fold 94 about a leading edge 102 of a screened fulcrum piece 96. The length and weight of the lagging counter weight arm portion 92 relative to the leading deflecting arm portion 90 determines the degree of resilience exhibited by the valve piece 88.

The angle "A" between the leading and lagging valve arm portions 90 and 92 is sized to provide free movement of the valve piece 88 as it pivots about the upstream edge 102 of the fulcrum/screen piece 96. The fold 94 is supported on the edge 102 of the fulcrum/screen piece 96 and thus the lagging counter weight arm portion 92 is free to pivot about the edge 102 of the intermediate fulcrum/screen piece 96 in the space between the fulcrum/screen piece 96 and the internal surfaces of the side wall piece 72. A stop member 103 projects interiorly from the shell piece 70 to limit the range of movement of the downstream end of the counter weight arm portion 92.

The screened fulcrum piece 96 is constructed from a length of screen that extends in the cavity space 86 at an acute angle relative to the side wall piece 72 as the screen 96 projects downward toward the outlet port 80. The upstream edge 102 of the fulcrum/screen piece 96 particularly extends from between lateral supports 98 that project from an interior surface of the side wall piece 72 in the cavity space 86.

The fulcrum/screen piece 96 depends at an increasing angular orientation as it extends to rest on other downstream projections or supports 99 and a baffle or gate flange 100 adjacent the outlet port 80 of the cavity space 86. The downstream edge 101 of the fulcrum/screen piece 96 is supported on the baffle flange 100 interiorly of the diametric center of the housing 70, see FIG. 3. The baffle flange 100 also prevents seed from collecting behind the fulcrum/screen piece 96. The fulcrum/screen piece 96 is typically mounted to extend at an acute angle in a range of 10 to 30 degrees relative to the side wall piece 72.

Several longitudinal vents or relief ports 104 are let through the side walls of the shell piece 72. The ports 104 extend longitudinally adjacent the counter weight arm portion 92 and fulcrum/screen piece 96. Air entering the housing 70 with the seed is vented through the pores of the fulcrum/screen piece 96 and the ports 104. The screen 96 presently exhibits a mesh or grit porosity in the range of $1/32^{nd}$ (0.03125) to $5/32^{nd}$ (0.15625) inch at each pore. Screening with other mesh or grit sizes can be used depending upon the seed size to prevent venting the seed from the housing 70 as the air is dissipated. If the screen pores are too small the pores will clog with fertilizer dust and not vent properly. Although the relief vents 104 presently only extend along the length of the counter weight arm portion 92, more or less vents 104 can be provided and aligned as desired to the included valve piece 88 and fulcrum/screen piece 96.

Returning attention to the upstream seed deflecting arm portion 90 of the valve piece 88, it includes a secondary bend or downstream tail piece end 106 that extends into the bore of the cavity space 86 approximately to the diametric center. The tail piece 106 projects at an angle "B" in the range of 10 to 25 degrees from an upstream upper arm piece 108 of the seed deflecting arm portion 90. The angles "A" and "B" are established to assure contact between the entering seed with the deflecting arm portion 90. The relative angles "A" and "B" and lengths of the arm pieces 106 and 108 and valve arm portions 90 and 92 are established to provide a desired resilience at the hinged valve piece 88 to prevent damaging the seeds as they engage the valve piece 88.

The type of material(s) from which the valve piece 88 and fulcrum/screen piece 96 are constructed is selected to withstand the abrading effects of the high velocity seed as it encounters the valve and screen pieces 88 and 96. Although a counter weight arm portion 92 is provided and has proven effective, the material used to construct the seed deflecting valve piece 88 and fulcrum piece 96 can be selected and/or the valve piece 88 can be shaped to exhibit an intrinsic resilience. A resilient spring member may also be mounted between the arm portion 92 and the housing side wall 72. Additional bends or resilient extensions may also be included at the seed deflecting valve piece 88 to provide desired seed deflection angles and resilience. Ideally the seed deflecting valve piece 88 is resiliently suspended in a fashion somewhat akin to a reed valve to avoid fracturing the seed as the air is vented from the housing 70.

As described above the seed deflecting valve piece 88 and fulcrum/screen piece 96 are mounted to the longitudinal or side wall shell piece 72 of the housing 70. With attention to FIG. 5, the adjoining side wall or shell piece 74 includes a second valve piece 110. The valve piece 110 is also resiliently mounted and positioned like a second reed valve to deflect seed between the valve pieces 88 and 110 to dissipate energy.

A downstream portion 109 of the valve piece 110 extends at an acute angle "C" in the range of 10 to 30 degrees relative to the interior surfaces of the shell piece 74 toward the diametric center of the housing 70. A downstream edge 111 of the second valve piece 110 terminates before intersecting the valve piece 88 and/or above the adjacent edge 101 of the fulcrum screen piece 96 and just short of the diametric center of the cavity space 86. A gap is thus formed in the central region of the bore space 86 between the downstream edges 101 and 111 of the seed deflecting valves 88 and 110 and through which the seed falls after the air is vented.

A forward or upstream end 113 of the valve piece 110 is rigidly fastened to the side wall 74 and the unsupported downstream end 109 resiliently flexes in the housing 70. The angular extension of the valve end 109 thus exhibits an inherent resilience. Seed initially deflected by the pivoting valve piece 88 upon entering the cavity space 86 is directed to impinge onto the second valve piece 110. The flexion and angular orientation of the second valve piece 110 re-directs the seed back against the valve piece 88 or the fulcrum/screen 96. The back and forth ricocheting effects of the valve pieces 88 and 110 and simultaneous venting of the conveying air completely reduces the velocity of the seeds such that the spent seeds generally exhibit zero velocity and gravitationally fall at a generally singular rate from the outlet port 80.

It is to be appreciated the resilience of the valve piece 110 can be varied with different mountings or the use of different materials. The valve piece 110 might also be constructed of a porous material to vent air. The fulcrum piece 96 might also merely comprise a pivot member about which the valve piece 88 pivots. The counter weight arm portion 92 might also be mounted to deflect seed onto the valve piece 110.

As the spent seeds pass the distal end of the fulcrum/screen 96 and downstream edge 111 of the second valve piece 110, the seed momentarily falls to collect on a flange or ledge 112 that projects into the cavity or bore space 86. The ledge 112 interrupts the seeds' passage through the housing 70 and causes a small amount of seed to collect at the ledge 112. The seed eventually randomly falls at a generally singular rate from the ledge 112 and through the seeder head or boot 60. The displacement between the dispensed seeds generally depends upon the speed of the planter arm. A farmer is however assured that un-fractured seed is dispensed into and not outside the furrow.

While the invention has been described with respect to a presently preferred assembly and considered improvements, modifications and/or alternatives thereto, still other assemblies and arrangements may be suggested to those skilled in the art. It is also to be appreciated that the features of the foregoing diffuser housing assembly can be arranged in different combinations. For example, the valve pieces 88 and/or 110 can be constructed to provide a variety of different resilient mountings that promote deflection and energy dissipation. The foregoing description should therefore be construed to include all those embodiments within the spirit and scope of the following claims.

What is claimed is:

1. Apparatus for air delivery seed planters comprising:
    a) a housing adapted for attachment to a conduit coupled to convey seeds in a stream of air and having input and output ports and an intermediate channel through which seeds are conveyed, wherein said housing includes air vents for exhausting air from said housing to the atmosphere;
    b) a first valve member resiliently mounted in said channel to a screen member mounted to exhaust air from said housing through pores of said screen and said air vents and such that seed entering said input port impinges on said first valve member to transfer energy and reduce the velocity of impinging seed; and
    c) a second valve member mounted in said channel relative to said first valve member such that seed impinging on said first valve member is deflected back and forth between said first valve member and said second valve member to progressively reduce the air velocity energy of said seed to substantially zero to fall under gravitational forces from said outlet port.

2. Apparatus as set forth in claim 1 wherein said screen member is rigidly mounted at an acute angle relative to a longitudinal air flow axis of said housing.

3. Apparatus as set forth in claim 1 wherein said first valve member comprises a seed deflecting arm and a counter weight arm and wherein said seed deflecting and counter weight arms extend at an acute angle from a pivot bend and wherein said pivot bend is mounted to said screen member such that said seed deflecting arm pivots back and forth relative to said screen member under the impact of seed striking said seed deflecting arm.

4. Apparatus as set forth in claim 3 wherein said counter weight arm determines the degree of resilience to impinging seed exhibited by said seed deflecting arm.

5. Apparatus as set forth in claim 3 wherein said seed deflecting arm includes first and second portions, wherein said first portion extends at a first acute angle relative to said counter weight arm and said second portion extends at a second acute angle from said first arm portion relative to said counter weight arm.

6. Apparatus as set forth in claim 1 wherein said screen member and said second valve member extend at intersecting acute angles and wherein downstream edges of said first valve member and said second valve member are displaced apart in a region adjacent said output port of said housing in proximity to a ledge upon which spent seed momentarily collects before falling.

7. Apparatus as set forth in claim 1 wherein said second valve member comprises a plate resiliently supported in said channel in the path of seed entering the channel to absorb energy from seed impinging on the second member.

8. Apparatus as set forth in claim 1 wherein said second valve member comprises a plate mounted at an acute angle relative to a seed flow axis of said housing having an upstream leading end rigidly supported to said housing adjacent said input port and a downstream trailing end resiliently suspended within said channel to deflect and absorb energy from impinging seeds.

9. Apparatus as set forth in claim 1 wherein said housing includes a ledge positioned to collect spent seed prior to the spent seed falling from said housing.

10. Apparatus for air delivery seed planters comprising:
    a) a housing adapted for attachment to a conduit coupled to convey seeds in a stream of air and having input and output ports and an intermediate channel through which seeds are conveyed and wherein air vent ports communicate through side walls of said housing to the atmosphere;
    b) a first valve member resiliently mounted within said housing and positioned in the channel such that seed entering said input port impinges on said first valve member to absorb energy and reduce the velocity of impinging seed, wherein said first valve member comprises a seed deflecting arm and a counter weight arm, wherein said seed deflecting and counter weight arms extend at an acute angle from a pivot bend, and wherein said pivot bend is mounted such that said seed deflecting arm pivots back and forth under the impact of seed striking said seed deflecting arm; and c) a second valve member mounted relative to said first valve member such that seed impinging on said first valve member is deflected back and forth between said first valve member and said second valve member as air is vented from said housing to progressively reduce the air velocity energy of said seed to substantially zero to fall under gravitational forces from said outlet port.

11. Apparatus as set forth in claim 10 wherein said housing includes a screen member mounted to cover said vent ports and wherein said pivot bend is mounted to pivot about a peripheral edge of the screen member.

12. Apparatus as set forth in claim 10 wherein said second valve member comprises a plate having a leading upstream end rigidly supported to said housing adjacent said input port and a trailing downstream end resiliently suspended within said channel.

13. Apparatus as set forth in claim 10 wherein said seed deflecting arm includes first and second portions, wherein said first portion extends at a first acute angle relative to said counter weight arm and said second portion extends at a second acute angle greater than said first acute angle relative to said counter weight arm.

14. Apparatus as set forth in claim 10 wherein said housing includes a ledge positioned downstream of said seed deflecting arm to momentarily collect spent seed prior to the spent seed falling from said housing.

15. Apparatus for air delivery seed planters comprising:
a) a housing adapted for attachment to a conduit coupled to convey seeds in a stream of air and having input and output ports and an intermediate channel through which seeds are conveyed and wherein air vent ports communicate through side walls of said housing to the atmosphere;
b) a first valve member mounted to pivot back and forth within said housing and positioned in the channel such that seed entering said input port impinges on said first valve member to absorb energy and reduce the velocity of impinging seed, wherein said first valve member comprises a seed deflecting arm and a counter weight arm, wherein said seed deflecting and counter weight arms extend at an acute angle from a pivot bend, and wherein said pivot bend is mounted to a pivot member secured to said housing such that said seed deflecting arm resiliently pivots back and forth under the impact of seed striking said seed deflecting arm; and
c) a second valve member mounted relative to said first valve member such that seed impinging on said first valve member is deflected back and forth between said first valve member and said second member such that the seed entering said housing in a high velocity stream of air eventually falls at substantially zero velocity under gravitational forces from said outlet port.

16. Apparatus as set forth in claim 15 wherein said pivot member comprises a screen mounted to vent air through said vent ports, wherein said pivot bend pivots about a surface of said screen, wherein said seed deflecting arm includes first and second portions, and wherein said first portion extends at a first acute angle relative to a seed flow axis of said housing and said second portion extends at a second acute angle greater than said first acute angle relative to said seed flow axis.

17. Apparatus for air delivery seed planters comprising:
a) a housing adapted for attachment to a conduit coupled to convey seeds in a stream of air and having upstream input and downstream output ports and an intermediate open channel through which seeds are conveyed, wherein said housing includes a screen mounted to cover air vents for exhausting air from said housing to the atmosphere as seed traverses said channel;
b) a first valve member supported at an upstream end to said housing and having a downstream end suspended in said channel to resiliently flex and absorb energy as seed contacts and deflects away from said first valve member; and
c) a second valve member having an upstream end supported to a pivot member supported to said housing and having a downstream end suspended in said channel to resiliently pivot as seed contacts and deflects away from said second valve member and mounted relative to said first valve member such that as seed passes between said first and second valve members and through said channel the conveying air is exhausted through said screen and air vents and the seed is deflected back and forth to impinge on and induce said first and second valve members to respectively and repeatedly flex and pivot and absorb energy and thereby to progressively reduce the velocity of said seeds to substantially zero in the region of said output port whereupon the spent seeds fall under gravitational forces from said outlet port.

18. Apparatus as set forth in claim 17 wherein said second valve member comprises a seed deflecting arm and a counter weight arm, wherein said seed deflecting and counter weight arms extend at an acute angle from a pivot bend, and wherein said pivot bend is mounted to said pivot member such that said seed deflecting arm resiliently pivots back and forth under the impact of seed striking said seed deflecting arm.

19. Apparatus as set forth in claim 18 wherein said pivot member comprises said screen.

20. Apparatus as set forth in claim 18 wherein said first and second valve members extend at intersecting acute angles in said channel and wherein the downstream ends of said first and second valve members are displaced apart in a region adjacent said output port in proximity to a ledge upon which spent seed momentarily collects before falling from said outlet port.

* * * * *